No. 796,005. PATENTED AUG. 1, 1905.
A. O'BRIEN.
SELF CLOSING VALVE.
APPLICATION FILED FEB. 23, 1904.
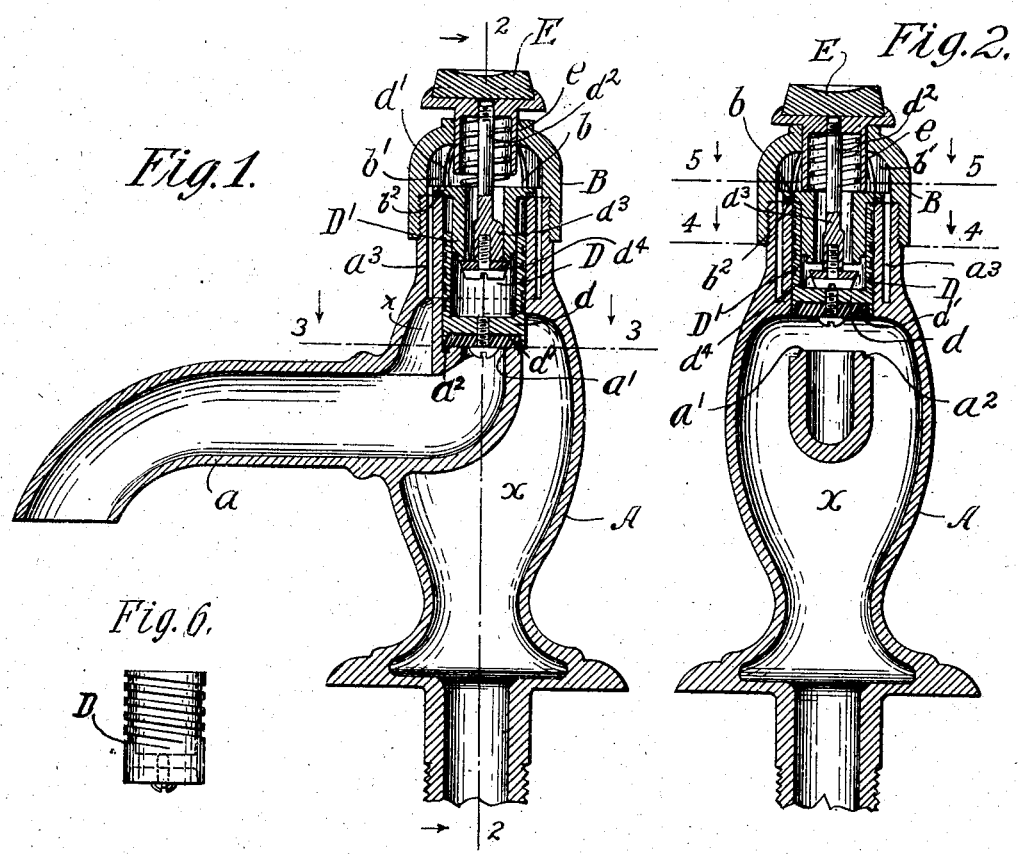
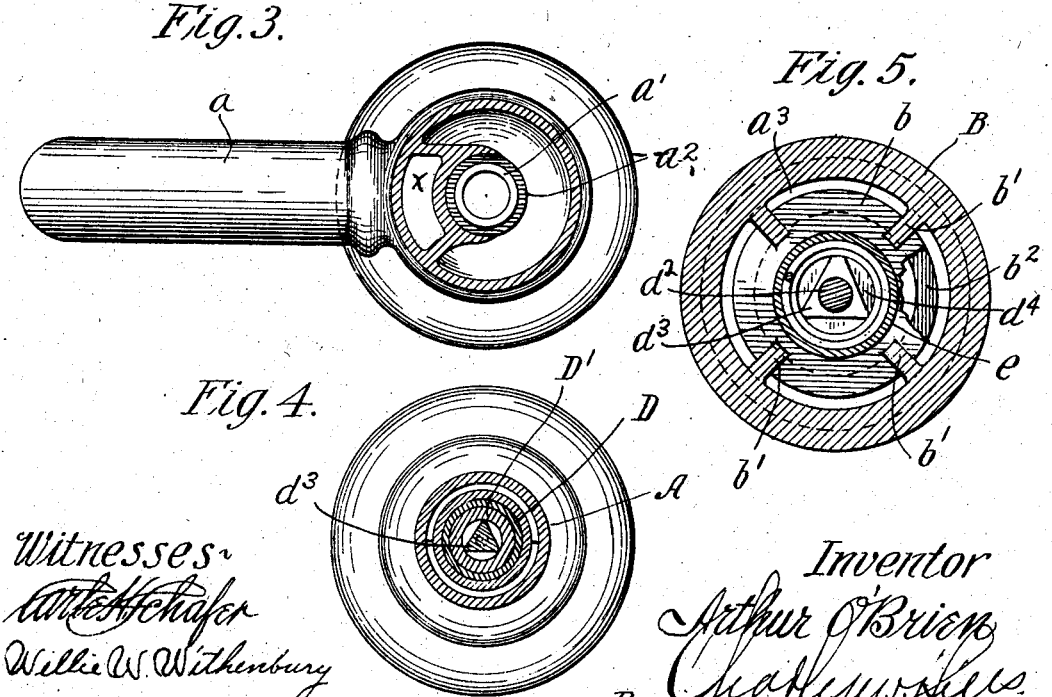

UNITED STATES PATENT OFFICE.

ARTHUR O'BRIEN, OF CHICAGO, ILLINOIS.

SELF-CLOSING VALVE.

No. 796,005.  Specification of Letters Patent.  Patented Aug. 1, 1905.

Application filed February 23, 1904. Serial No. 194,705.

*To all whom it may concern:*

Be it known that I, ARTHUR O'BRIEN, a citizen of the United States, and a resident of Chicago, Cook county, Illinois, have invented certain new and useful Improvements in Self-Closing Valves; and I do hereby declare that the following is a full, clear, and exact description of the same, reference being had to the accompanying drawings, and to the letters of reference marked thereon, which form a part of this specification.

This invention relates to improvements in self-closing valves, and is shown embodied in a basin-cock, though obviously the same may be embodied in combination with any device in which automatically-closing valves are desirable.

Heretofore with self-closing valves, such as used in faucets and cocks, it has been difficult to provide a valve adapted to close against the pressure without occasioning such hammering or pounding in the pipes (due to the closure of the valve) as in some instances even to endanger the pipes and connections when high pressure is to be controlled. In devices closing against the pressure springs have been used and when so used are subject to deterioration, due to the constant use of the same and in some instances the continued effect of hot water, frequently under considerable pressure.

The object of this invention is to provide a valve for faucets or other purposes adapted to close both with and against the pressure and so constructed as to afford instantaneous full opening and a timed or gradual closure with and against the pressure, thus to an extent balancing the operation of the valve in closing and entirely obviating the hammering or pounding so frequently objectionable. This renders the use of springs or other auxiliary resilient means acting to resist the pressure unnecessary.

It is also an object of the invention to provide a construction in which packing is reduced to a minimum and to afford a device of such simple, inexpensive, and durable construction as to obviate expense for repairs.

The invention embraces many novel features; and it consists in the matters hereinafter described, and more fully pointed out and defined in the appended claims.

In the drawings, Figure 1 is a central vertical section of a basin-cock embodying my invention, showing the valve closed. Fig. 2 is a view taken at right angles of that shown in Fig. 1 and showing the valve open. Fig. 3 is a section taken on line 3 3 of Fig. 1. Fig. 4 is a section taken on line 4 4 of Fig. 2. Fig. 5 is a section taken on line 5 5 of Fig. 2. Fig. 6 is a side elevation of the cylinder.

As shown in said drawings, A indicates the faucet-body of the usual or any desired type, provided in the present instance with a laterally-directed delivery-spout $a$ integral therewith and which at its inner end opens upwardly and is provided with an upwardly-directed seat, (indicated by $a'$.) Said seat, as shown, is circular and provided on its outer side with a peripheral recess or groove $a^2$, as shown in Figs. 1 and 2. Extending upwardly above the seat is a cylindric bore axial therewith, and the side walls of which are integral with the faucet-body and on the front side of the seat afford a closure between the spout and the water-chamber X below the spout. On the rear side of the seat the water-chamber opens into said spout when the valve is open. An annular recess or chamber $a^3$ is provided concentric with said bore and surrounding the same, and which on the front side of the faucet opens into a chamber $x$, located above and in open communication with said spout, as shown in Fig. 1. The upper end of the faucet-body is closed by a screw-cap B, which extends above the faucet-body, and the upper end of said bore is closed by a plate $b$, beneath which is provided suitable packing (indicated by $b^2$) and which is rigidly engaged in position by means of the wings $b'$ within and integral with the screw-cap, as shown in Fig. 5, so that said screw-cap when in position acts to jam said plate $b$ rigidly upon the upper end of the faucet-body, tightly closing the upper end of the bore. Fitted and slidable in said bore is a hollow cylinder D, which is open at its upper end and the lower end of which is provided with a transverse closed head $d$, in which is secured a packing-washer $d'$, adapted to engage upon the seat $a'$ of the discharge spout or pipe and close the valve, as shown in Fig. 1, in which position a portion of the cylinder extends peripherally beyond the seat and is exposed to upward pressure. Said cylinder is provided externally intermediate its ends with a spiral groove, which when the valve is closed opens at the lower end into the water-chamber X. Fitted closely within the open upper end of said cylinder D is a cylindric sleeve D', which, as shown, is integral with the plate $b$ and through which extends the threaded stem $d^2$, which at its inner end is provided with an enlarged grooved head $d^3$, which fits in said sleeve. A packing $d^4$ of any desired kind is secured on said head and affords a tight joint with the inner end of said sleeve, as shown in Figs. 1 and 2. Said stem projects through the plate $b$ and has threaded engagement at its outwardly-directed end with a push-button E, carried above the screw-cap and which is provided with a central integral sleeve $e$, which extends through said cap axially of the faucet-body. Said sleeve $e$ is of greater internal diameter than the bore of the sleeve D' and being directly above said bore acts as a deflector for any water or other fluid jetting upwardly through the aperture in said plate and directs the same peripherally of the screw to the annular chamber $a^3$, surrounding said bore, from whence the same escapes into the delivery-spout.

The operation is as follows: When assembled as described and connected with a suitable source of supply, the cylinder D is normally filled with water and the valve within the cylinder remains closed, owing to the pressure of the water, a small quantity of which flows past the somewhat loosely-fitting cylinder D and into said cylinder. The water-pressure at the top of the cylinder and within the same also holds the cylinder to its seat. Should now pressure be applied upon the push-button opening the valve at the end of the sleeve D' within the cylinder D, the opening of said valve removes the pressure from above and within the cylinder D. The upward pressure of the water or fluid at the lower end of the cylinder acts immediately to force the same upwardly, as shown in Fig. 2. As long as the button is held in its depressed position the valve remains open, inasmuch as any fluid finding its way into the cylinder D escapes through the sleeve D' and thence through the annular chamber into the spout. Upward flow through the sleeve D' is sufficient ordinarily to close the valve in said cylinder, thus shutting off the escape of the fluid, whereupon the accumulation of water in the cylinder quickly forces said cylinder downwardly to its closed position against the pressure of the water flowing into the spout. As soon as the cylinder D seats upon the inlet-orifice of the spout the pressure within the cylinder, owing to the greater exposed area, becomes much greater than the upward pressure on the lower end of the cylinder, thus obviating any tendency for the valve to open.

As shown and conveniently, a spring is seated in the sleeve $e$ and bears at opposite ends against the plate $b$ and the push-button E and acts to immediately close the vent-valve or that within the cylinder when the button is released, thus acting to close the vent-valve quickly when pressures to be controlled are slight.

While I have shown my invention embodied in a faucet or cock, it is obvious that valves constructed to embody my invention may be used for any purpose.

Obviously many details of construction may be varied without departing from the principles of this invention.

I claim as my invention—

1. A valve comprising a chamber, a valve-seat adjacent the upper end thereof, a bore extending upwardly from said seat and opening at its lower end in said chamber, an annular chamber surrounding said bore and opening into the valve-spout, a valve adapted to normally close the opening between said bore and said annular chamber a sleeve extending into said bore and a cylinder in said bore inclosing said sleeve and adapted to engage said seat.

2. A valve comprising a seat, a bore extending axially thereof, a chamber below said seat and communicating with said bore, an annular chamber surrounding said bore, a plate rigidly engaged on the upper end of said bore, a sleeve extending downwardly therefrom, a valve adapted to close said sleeve and a cylinder having a peripheral groove on its outer side movably engaged between the wall of said bore and said sleeve and adapted to engage on said seat.

3. In a faucet, a valve-body, a delivery-spout thereon, a seat on the inner end of said spout, a cylindric bore extending upwardly from said seat, a cylinder in said bore adapted to engage on said seat and provided with a peripheral groove opening above and below the same, an annular plate closing the upper end of said bore, a sleeve thereon forming with the walls of said bore, a recess for said cylinder, a valve controlling said sleeve and a screw-cap engaged on the valve-body and provided with inwardly-directed ribs adapted to hold said plate in place.

4. A faucet comprising a faucet-body, a delivery-spout extending therefrom, a circular valve-seat at the inner end of the spout, a bore extending axially therefrom and open adjacent the seat to afford inlet to the delivery-spout, an annular chamber or passage surrounding said bore and opening into the delivery-pipe, a plate closing the bore at the upper end, a cylinder slidable in said bore and affording a closure for said seat, a short sleeve or pipe fitting in said cylinder and opening through said plate, a vent-valve in the inner end of said pipe, a stem connected with the valve-closure and extending outwardly through said plate, manually-operated means on the stem acting to open the vent-valve and a spring acting to close the same.

5. A faucet comprising a faucet-body, a delivery-spout opening therefrom, having an upwardly-directed seat at its inner end, a bore extending axially above the seat, an annular passage or chamber surrounding said bore and opening into the delivery-spout, a plate engaged on and tightly closing the upper end of the bore, a screw-cap acting to hold said plate in position, a cylindric valve-closure slidable in said bore and provided with channels in its outer side and having a closed inner end acting to engage on the seat and projecting peripherally beyond the same, a pipe fitting closely in and shorter than said cylinder, a stem extending therethrough a valve-closure on the inner end of said stem adapted to close said pipe-operating means carried on the outer end of said stem and a deflector adapted to direct fluid escaping from said pipe into said annular passage.

6. A valve comprising an upwardly-directed valve-seat a bore extending axially thereof, a plate covering and tightly closing the bore at its upper end, a hollow cylinder slidable in the bore and at its lower end affording a closure for the valve-seat and projecting peripherally beyond the same, a pipe carried on and opening through said plate and extending into and shorter than said cylinder, a pressure-closing vent-valve in said pipe and externally-operated means for actuating the vent-valve.

In testimony whereof I have hereunto subscribed my name in the presence of two subscribing witnesses.

ARTHUR O'BRIEN.

Witnesses:
   C. W. HILLS,
   W. W. WITHENBURY.